United States Patent
Saleh

(10) Patent No.: US 12,080,099 B2
(45) Date of Patent: Sep. 3, 2024

(54) FACE MASK DETECTION SYSTEM AND METHOD

(71) Applicant: Ahmad Saleh, Dubai (AE)

(72) Inventor: Ahmad Saleh, Dubai (AE)

(*) Notice: Subject to any disclaimer, the term of this patent is extended or adjusted under 35 U.S.C. 154(b) by 407 days.

(21) Appl. No.: 17/394,873

(22) Filed: Aug. 5, 2021

(65) Prior Publication Data

US 2022/0044007 A1 Feb. 10, 2022

Related U.S. Application Data

(60) Provisional application No. 63/061,320, filed on Aug. 5, 2020.

(51) Int. Cl.
| | |
|---|---|
| *G06K 9/62* | (2022.01) |
| *G06F 18/20* | (2023.01) |
| *G06F 18/2413* | (2023.01) |
| *G06V 40/16* | (2022.01) |
| *G06V 40/20* | (2022.01) |

(52) U.S. Cl.
CPC ........ *G06V 40/172* (2022.01); *G06F 18/2413* (2023.01); *G06F 18/285* (2023.01); *G06V 40/161* (2022.01); *G06V 40/20* (2022.01)

(58) Field of Classification Search
CPC ... A41D 13/11–13/1192; G06V 40/16–40/179
See application file for complete search history.

(56) References Cited

U.S. PATENT DOCUMENTS

| | | | |
|---|---|---|---|
| 11,188,781 B2* | 11/2021 | Yabuuchi | G06V 20/52 |
| 2010/0183218 A1* | 7/2010 | Naito | G06V 40/171 |
| | | | 382/159 |
| 2017/0339139 A1* | 11/2017 | Rajakumar | H04N 21/4415 |
| 2020/0012887 A1* | 1/2020 | Li | G06F 18/254 |
| 2022/0012894 A1* | 1/2022 | Lev | G06V 40/166 |

OTHER PUBLICATIONS

Nieto-Rodriguez et al, "System for Medical Mask Detection in the Operating Room Through Facial Attributes", Springer International Publishing Switzerland 2015, R. Paredes et al. (Eds.): IbPRIA 2015, LNCS 9117, 4 bib pages and pp. 138-145, 2015. (Year: 2015).*

* cited by examiner

*Primary Examiner* — Brian Werner
(74) *Attorney, Agent, or Firm* — Hayes Soloway P.C.

(57) ABSTRACT

A face mask detection system for detecting whether a user is wearing a mask at any given time using simple image recognition, configured to obtain an image of the user with the face mask, validate the image of the user wearing the face mask by an administrator (different from the user) in order to confirm validity of the image, and as a subsequent step use the validated image of the user with the face mask as a model image for benchmarking purposes. The model image is preferably a head profile of the user wearing a face mask. A face mask investigation unit compares the model image to an investigation image captured by an imaging system during an investigation process to determine whether the user in the investigation image is wearing the face mask based on whether an exact match is found between the model image and the investigation image.

19 Claims, 10 Drawing Sheets

FACE MASK DETECTION SYSTEM AND METHOD

CROSS-REFERENCE TO RELATED APPLICATIONS AND PRIORITY

This patent application claims priority from U.S. Provisional Patent Application No. 63/061,320 filed Aug. 5, 2020. This patent application is herein incorporated by reference in its entirety.

FIELD OF THE INVENTION

The present invention relates to the field of image recognition systems, and more particularly to a face mask detection system and method for determining whether a user is wearing a mask as part of safety and access-control measures taken by various facilities and organizations.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

The COVID-19 and other infectious diseases have changed the way people and businesses operate. Social distancing is nowadays a must in order to prevent the spread of such infectious diseases. Unfortunately, with the ease of lockdowns, businesses and governments are still struggling to find solutions for securing the health and safety of their people. People need to wear face masks as a remedy to businesses, governments and facility managers for controlling or reducing infections in business and public places such as business offices, shopping malls, hospitals, schools, and so on. People are failing to appropriately apply the face masks or face shields on a voluntary basis or apply social distancing rules which is resulting on an increasing number of infections every day. The economic situation is impacted in consequence, and the private and public sector has been desperately trying to find solutions for monitoring the appropriate use of face masks by people in various places, such as indoor facilities such as malls, hospitals, company premises and the like.

Traditional imaging systems, and face recognition systems fail to provide reliability in determining whether users are wearing face masks in controlled areas which requires complex data processing techniques which remain ineffective and overly complex, time consuming and unreliable. This is as the shapes of face masks are indefinite and the progress of sciences in the field of artificial intelligence is still not at a level which can be relied upon for effective and accurate determination.

Traditional systems (including access controls systems) fail to provide such a control and fail to differentiate between persons using personal protective equipment such as masks/shields and people not complying with these requirements. The traditional way of controlling the use of masks/shields in controlled areas (such as malls, restaurants, etc) is to rely on human security guards at the gate entries which is ineffective in many cases.

SUMMARY OF THE INVENTION

Therefore it is an object of the present invention to provide face protection systems, methods and units which overcome the above mentioned drawbacks.

As a first aspect of the invention, there is provided a computer-implemented face mask detection method comprising:
 obtaining at least one model image of a user comprising a first model image of the user wearing a face mask;
 storing the at least one model image in a computer storage medium for benchmarking purposes;
 obtaining an investigation image of the user at a given time during an investigation process;
 processing, using a processor, the investigation image as a function of the at least one model image of the user for determining a protection status of the user at the given time; and
 generating an output signal based on the determined protection status of the user at the given time.

In an embodiment of the invention, the computer-implemented face mask detection method further comprises obtaining an authentication or validation of the at least one model image prior to and as a condition precedent to storing the at least one model image in the computer storage medium for benchmarking purposes.

In an embodiment of the invention, the obtaining an authentication or validation of the at least one model image comprises enabling an administrator, different from the user, to authenticate or validate the at least one model image as an authentic image of the user comprising enabling the administrator to authenticate the first model image as an authentic image of the user wearing the face mask.

In an embodiment of the invention:
 obtaining the at least one model image of the user comprises providing a user interface for taking, uploading or otherwise capturing at least one picture of the user comprising a first picture of the user wearing the face mask, wherein the at least one model image is selected from the at least one picture; and
 obtaining an authentication of the at least one model image comprises providing a second user interface for enabling the administrator to authenticate the at least one model image as being a true image of the user comprising enabling the administrator to authenticate the first model image as a true image of the user wearing the face mask.

In an embodiment of the invention, the processing the investigation image for determining a protection status of the user comprises comparing the investigation image to the first model image for determining if there is a match between the investigation image and the first model image, and wherein the protection status of the user is reflective of the user wearing the face mask in case a match is found between the first model image and the investigation image, otherwise in case of mismatch between both images, the protection status of the user is reflective of the user not wearing the face mask.

In an embodiment of the invention, the obtaining the at least one model image of the user and the obtaining an authentication or validation of the at least one model image comprise enabling the administrator to use the first and second interfaces for both obtaining and authenticating or validating the at least one model image of the user.

In an embodiment of the invention, the obtaining and authenticating or validating the at least one model image are conducted during a same time period while the administrator is in physical presence of the user, as a requirement for the authentication.

In an embodiment of the invention, the at least one model image of the user further comprises a second model image of the user without a face mask.

In an embodiment of the invention, the processing the investigation image for determining a protection status of the user comprises comparing the investigation image to the second model image for determining if there is a match between the investigation image and the second model image, and wherein the protection status of the user is reflective of the user not wearing the face mask in case a match is found between the second model image and the investigation image.

In an embodiment of the invention, the at least one model image comprises a series of images related to the user and the first model image of the user comprises a series of images of the user wearing a face mask from various angular perspectives.

In an embodiment of the invention, the at least one model image comprises a series of images related to the user and the first model image comprises a series of images of the user wearing various types of eligible face masks.

In an embodiment of the invention, the output face mask detection signal is an access control signal for controlling access of the user to an access-controlled area based on the determined protection status of the user, where the user is granted access to the access-controlled area in case the user is determined to be wearing the face mask and the user is denied access to the access-controlled area in case the user is determined not to be wearing the face mask as reflected by the protection status of the user.

In an embodiment of the invention, the output signal is a notification signal for notifying an administrator or a regulator about the protection status of the user, comprising a breach of safety notification in case the user is determined not to be wearing the face mask.

In an embodiment of the invention, the output signal is a time-sensitive data record stored in a safety database for tracking the protection status of the user, wherein the safety database receives and stores time-sensitive data records reflecting the protection status of the user over a period of time.

In an embodiment of the invention, the at least a part of the actions are conducted using a mobile device associated to the user.

In an embodiment of the invention, the mobile device is an iPhone using Apple's iPhone image authentication system by setting at least two user profiles: a) a first user profile with a face mask comprising the first model image; b) a second user profile without a face mask comprising the second model image.

As a further aspect of the invention, there is provided a face mask detection system comprising:
  an image capturing unit for obtaining at least one model image of a user comprising a first model image of the user wearing a face mask;
  a computer storage medium connected for storing the at least one model image for benchmarking purposes;
  an image processing unit, comprising a processor, connected to image capturing unit and to the computer storage medium for obtaining an investigation image of the user at a given time during an investigation process and for processing the investigation image as a function of the at least one model image of the user for determining a protection status of the user at the given time, and for generating an output signal based on the protection status of the user at the given time.

In an embodiment of the invention, the face mask detection system further comprises an authentication or validation unit connected to the image capturing unit and to the computer storage medium for obtaining an authentication or validation of the at least one model image prior to and as a condition precedent to storing the at least one model image in the computer storage medium for benchmarking purposes.

In an embodiment of the invention, the obtaining an authentication or validation of the at least one model image comprises enabling an administrator, different from the user, to authenticate or validate the at least one model image as an authentic image of the user comprising enabling the administrator to authenticate the first model image as an authentic image of the user wearing the face mask.

In an embodiment of the invention, the face mask detection system further comprises:
  a first user interface connected to the image capturing unit for enabling taking, uploading or otherwise capturing at least one picture of the user comprising a first picture of the user wearing the face mask, wherein the at least one model image is selected from the at least one picture; and
  a second user interface connected to the authentication or validation unit for enabling the administrator to authenticate or validate the at least one model image as being a true image of the user comprising enabling the administrator to authenticate or validate the first model image as a true image of the user wearing the face mask.

In an embodiment of the invention, the processing the investigation image for determining a protection status of the user comprises comparing the investigation image to the first model image for determining if there is a match between the investigation image and the first model image, and wherein the protection status of the user is reflective of the user wearing the face mask in case a match is found between the first model image and the investigation image, otherwise in case of mismatch between both images, the protection status of the user is reflective of the user not wearing the face mask.

In an embodiment of the invention, the obtaining the at least one model image of the user and the obtaining an authentication or validation of the at least one model image comprise enabling the administrator to use the first and second interfaces for both obtaining and authenticating the at least one model image of the user.

In an embodiment of the invention, the obtaining and authenticating or validating the at least one model image are conducted during a same time period while the administrator is in physical presence of the user, as a requirement for the authentication or validation.

In an embodiment of the invention, the at least one model image of the user further comprises a second model image of the user without a face mask.

In an embodiment of the invention, the processing the investigation image for determining a protection status of the user comprises comparing the investigation image to the second model image for determining if there is a match between the investigation image and the second model image, and wherein the protection status of the user is reflective of the user not wearing the face mask in case a match is found between the second model image and the investigation image.

In an embodiment of the invention, the at least one model image comprises a series of images related to the user and the first model image of the user comprises a series of images of the user wearing a face mask from various angular perspectives.

In an embodiment of the invention, the at least one model image comprises a series of images related to the user and the first model image comprises a series of images of the user wearing various types of eligible face masks.

In an embodiment of the invention, the output signal is an access control signal for controlling access to the user to an access-controlled area based on the determined protection status of the user, where the user is granted access to the access-controlled area in case the user is determined to be wearing the face mask and the user is denied access to the access-controlled area in case the user is determined not to be wearing the face mask as reflected by the protection status of the user.

In an embodiment of the invention, the output signal is a notification signal for notifying an administrator or a regulator about the protection status of the user, comprising a breach of safety notification in case the user is determined not to be wearing the face mask.

In an embodiment of the invention, the output signal is a time-sensitive data record stored in a safety database for tracking the protection status of the user, wherein the safety database receives and stores time-sensitive data records reflecting the protection status of the user over a period of time.

In an embodiment of the invention, at least a part of the system components are part of a mobile device associated to the user, and at least a part of face mask detection system actions are conducted by the mobile device.

In an embodiment of the invention, the mobile device is an iPhone using Apple's iPhone image authentication system by setting at least two user profiles: a) a first user profile with a face mask comprising the first model image; b) a second user profile without a face mask comprising the second model image.

As a further aspect of the invention, there is provided an access control system for controlling access of users to an access-controlled area based on access-controlled conditions comprising whether the users are wearing or not wearing face masks, the access control system being connected/configured to be connected to the face mask detection system according to the various embodiments of the present invention for controlling access of users to the access-controlled based on the output signals of the face mask detection system.

In an embodiment of the invention, the access control system further comprises the face mask detection system according to the various embodiments of the present invention.

In an embodiment of the invention, the controlled area is an airport, a hospital, a building, a company premises, a shopping mall, an elevator, or any other indoor facility.

In an embodiment of the invention, the controlled area is the airport and wherein the face mask detection system is integrated to the immigration authentication system, wherein the administrator is an immigration officer.

As a further aspect of the present invention, there is provided a surveillance system for surveilling safety of users within a controlled area based on safety criteria comprising whether the users are wearing or not wearing face masks, the surveillance system being connected/configured to be connected to the face mask detection system accordance to the various embodiments of the present invention for controlling safety of the users within the controlled zone based on the output signals of the face mask detection system.

In an embodiment of the invention, the surveillance system further comprising the face mask detection system according to the various embodiments of the present invention.

In an embodiment of the invention, the controlled area is an airport, a hospital, a building, a company premises, a shopping mall, an elevator, or any other indoor facility.

In an embodiment of the invention, the controlled area is the airport and wherein the face mask detection system is integrated to the immigration authentication system, wherein the administrator is an immigration officer.

As another aspect of the invention, there is provided a computer-implemented face mask detection method comprising:
enabling a user to provide a first model image of the user wearing a face mask;
enabling an administrator, different from the user, to authenticate the first model image of the user comprising confirming that the first model image is a true image of the user wearing a face mask;
in case of a successful authentication of the first model image by the administrator, providing the authenticated first model image to an investigation system for benchmarking purposes during an investigation process;
wherein the investigation system is configured to obtain an investigation image of the user during the investigation process, compare the obtained investigation image with the authenticated first model image to determine if there is a match, and generate a signal with an indication of whether the user is wearing a face mask in the investigation image based on the comparison.

In an embodiment of the invention, the investigation system determines that the user is wearing a face mask in the investigation image in case there is a high accuracy match between investigation image and the first model image.

In an embodiment of the invention:
enabling the user to provide a first model image comprises providing a first user interface configured to enable taking or uploading a picture of the user wearing the face mask; and
enabling an administrator to authenticate the first model image comprises providing a second user interface configured to enable the administrator to approve or reject the first model image.

In an embodiment of the invention:
the authentication by the administrator is conducted remotely from the user; and
the enabling an administrator to authenticate the first model user image comprises providing an authenticated image of the user without mask to the administrator to be used as a basis for the authentication of the first model image of the user wearing a mask.

In an embodiment of the invention, the method is conducted by a communication device in communication with the investigation system via a wireless data network.

In an embodiment of the invention, the communication device is a mobile device.

In an embodiment of the invention, the mobile device is an iPhone using Apple's iPhone image authentication system by setting at least two user profiles: a) a first user profile with a face mask comprising the first model image; b) a second user profile without a face mask comprising a second model image.

As a further aspect of the invention, there is provided a face mask detection system comprising:
a first user interface for enabling a user to provide a first model image of the user wearing a face mask;
a second user interface for enabling an administrator, different from the user, to authenticate the first model image of the user comprising confirming that the first model image is a true image of the user wearing a face mask; and a communication unit for providing the authenticated first model image to an investigation system for benchmarking purposes during an investigation process in case of a successful authentication of the first model image by the administrator.

In an embodiment of the invention, the investigation system determines that the user is wearing a face mask in the investigation image in case there is a high accuracy match between investigation image and the first model image.

In an embodiment of the invention:
the first user interface is configured to enable taking or uploading a picture of the user wearing the face mask; and
the second user interface is configured to enable the administrator to approve or reject the first model image.

In an embodiment of the invention:
the authentication by the administrator is conducted remotely from the user; and
the enabling an administrator to authenticate the first model user image comprises providing an authenticated image of the user without mask to the administrator to be used as a basis for the authentication of the first model image of the user wearing a mask.

In an embodiment of the invention, the system is part of a communication device in communication with the investigation system via a wireless data network.

In an embodiment of the invention, the communication device is a mobile device.

In an embodiment of the invention, the mobile device is an iPhone using Apple's iPhone image authentication system by setting at least two user profiles: a) a first user profile with a face mask comprising the first model image; b) a second user profile without a face mask comprising a second model image.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION OF THE INVENTION

Figure 1:
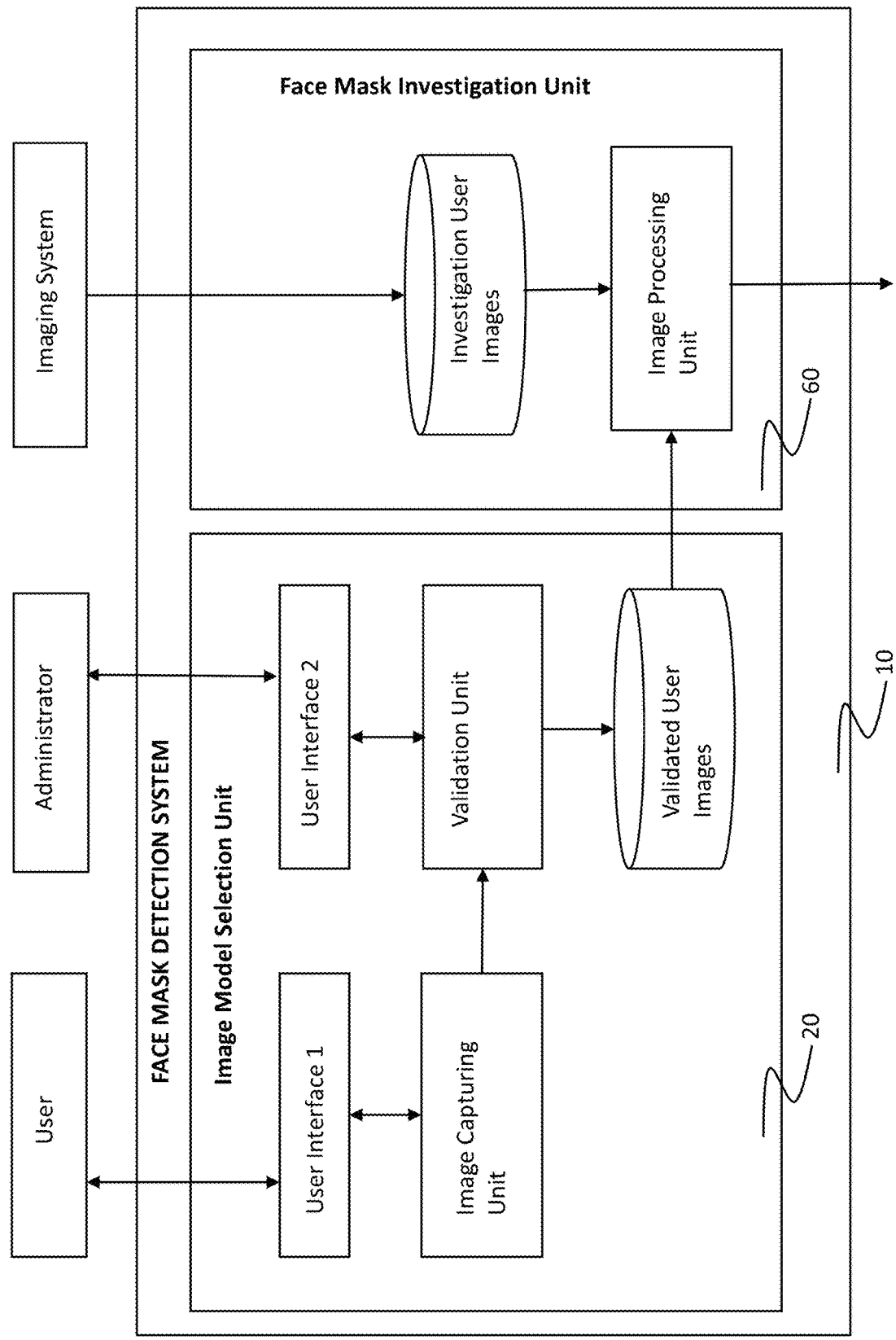
FIG. 1 illustrates a face mask detection system 10 in accordance with an embodiment of the present invention.
Figure 2:
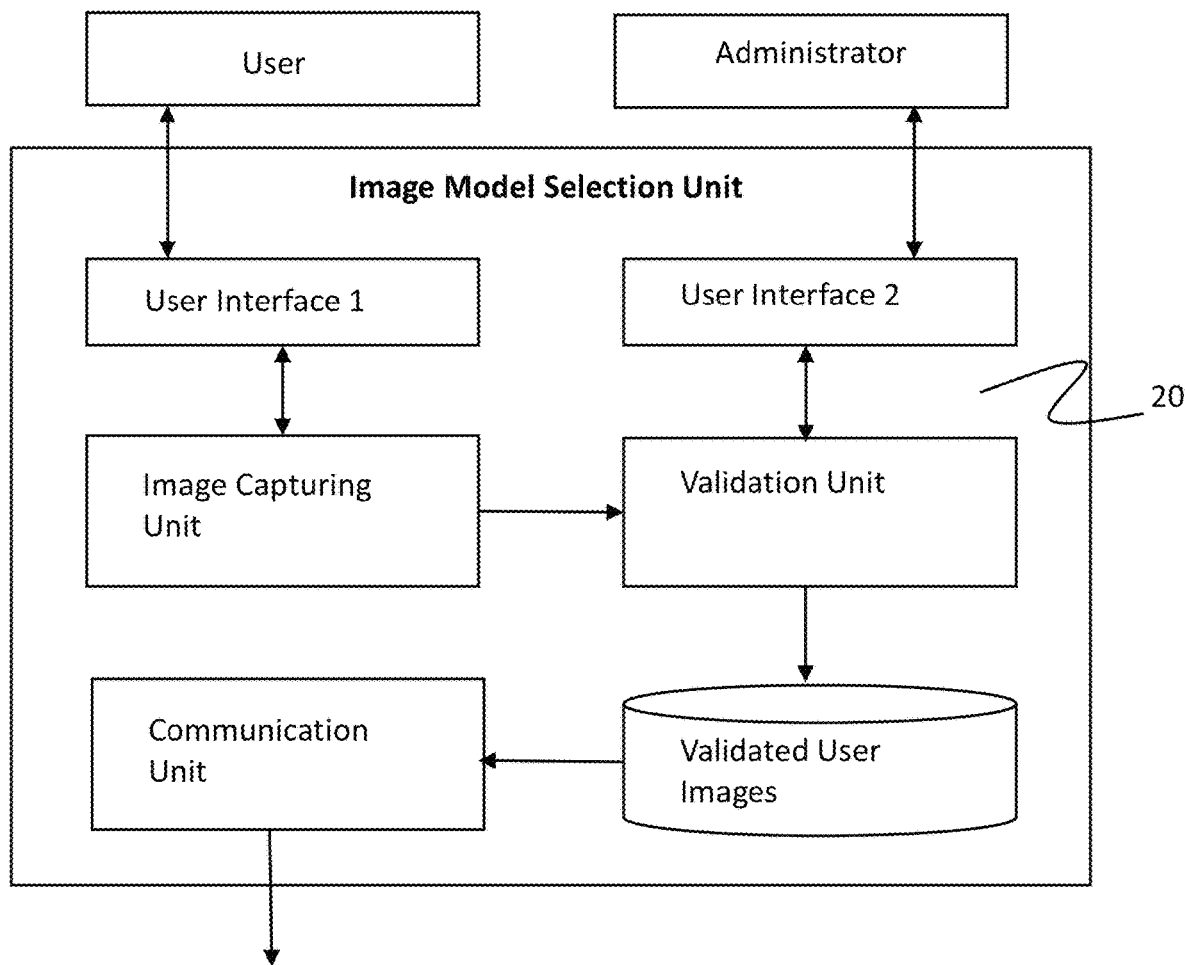
FIG. 2 illustrates a face mask authentication unit 20 in accordance with an embodiment of the present invention.
Figure 3:
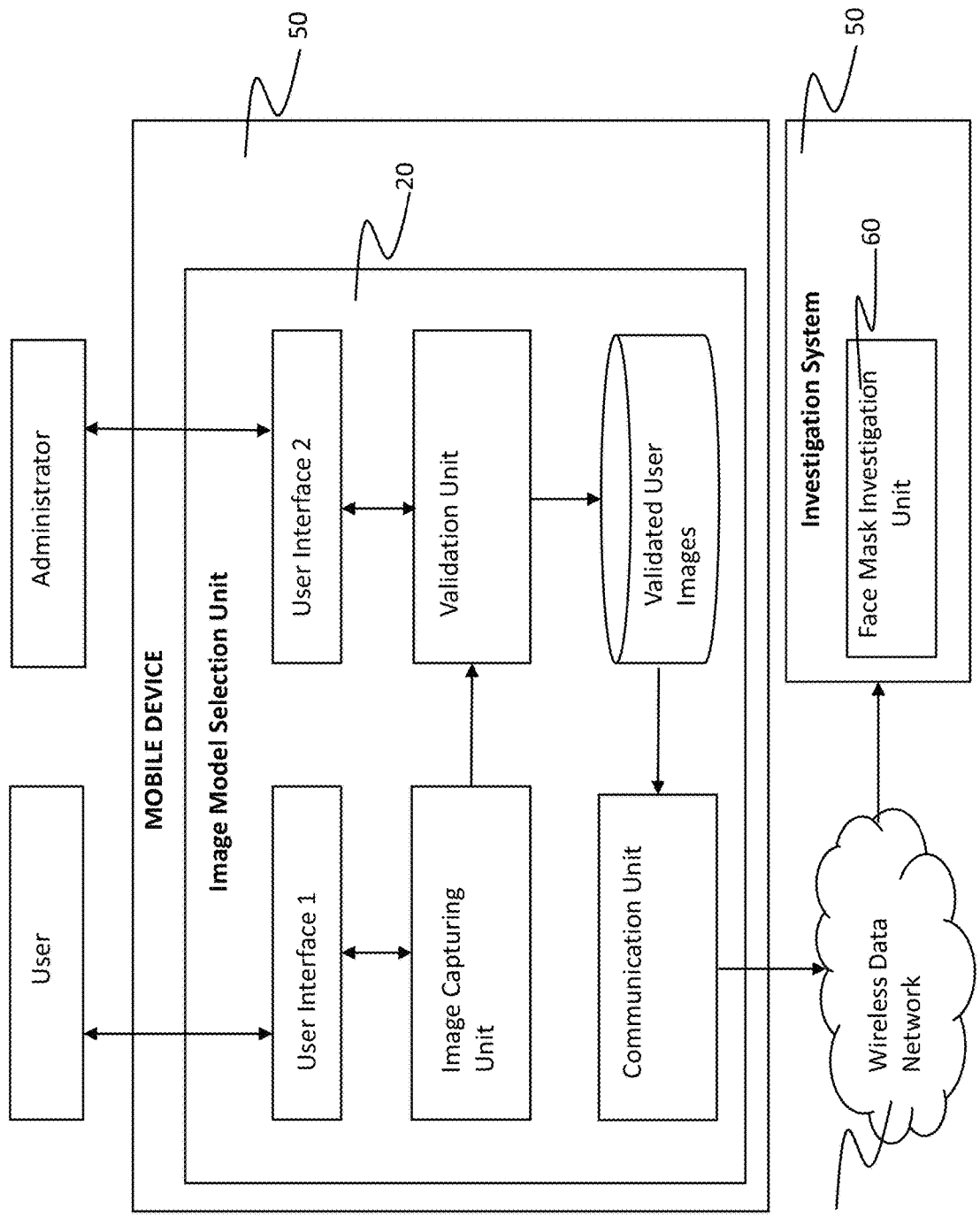
FIG. 3 illustrates a face mask authentication unit 20 running on a mobile device 50 in a wireless communication with a remote investigation system 55 in accordance with an embodiment of the present invention.
Figure 4:
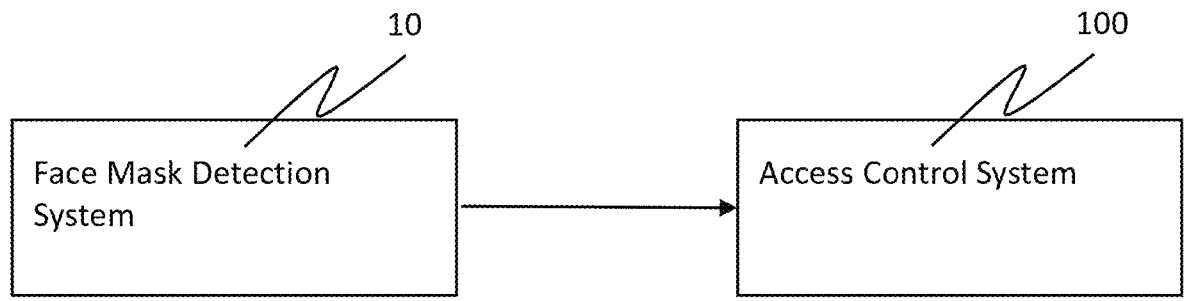
FIG. 4 illustrates a face mask detection system 10 in communication with an access control system 100 in accordance with an embodiment of the present invention.
Figure 5:
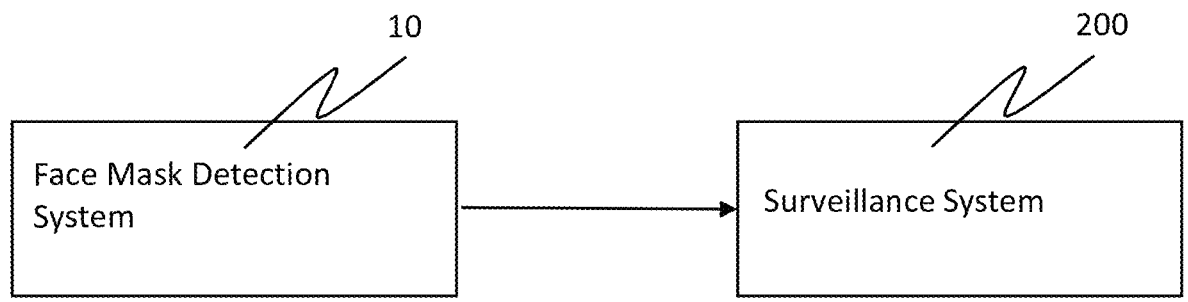
FIG. 5 illustrates a face mask detection system 10 in communication with a surveillance system 200 in accordance with an embodiment of the present invention.
Figure 6:
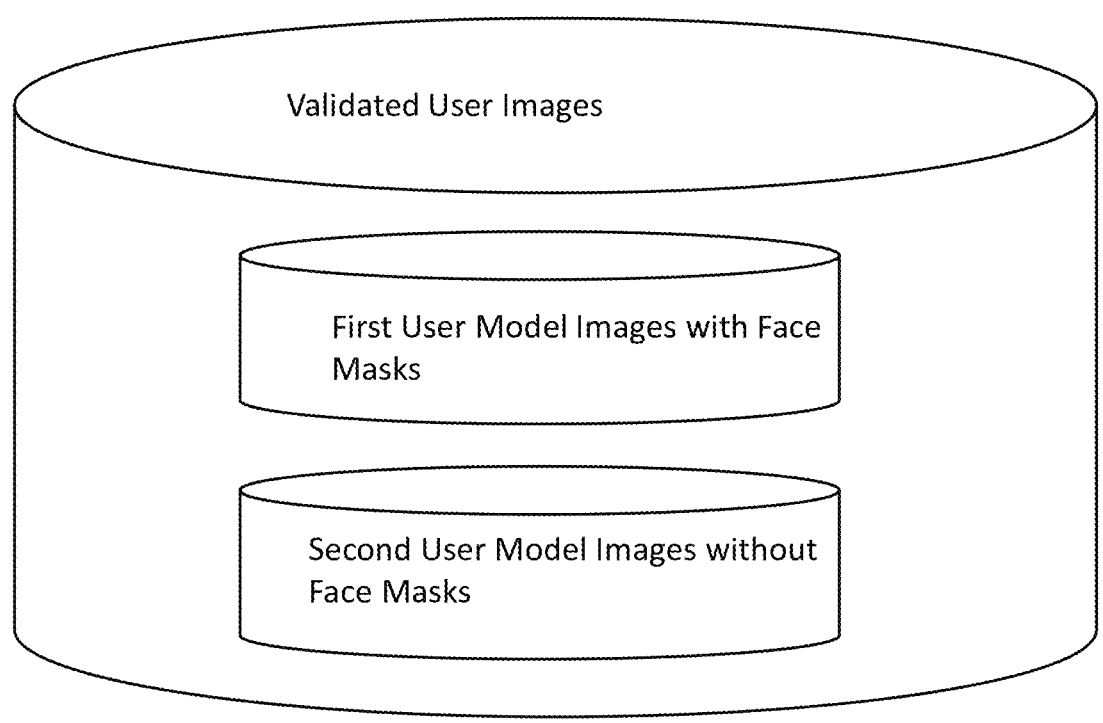
FIG. 6 illustrates a computer storage medium storing authenticated user images with a first database storing first user model images with face masks and a second database storing second user model images without face masks.
Figure 7:
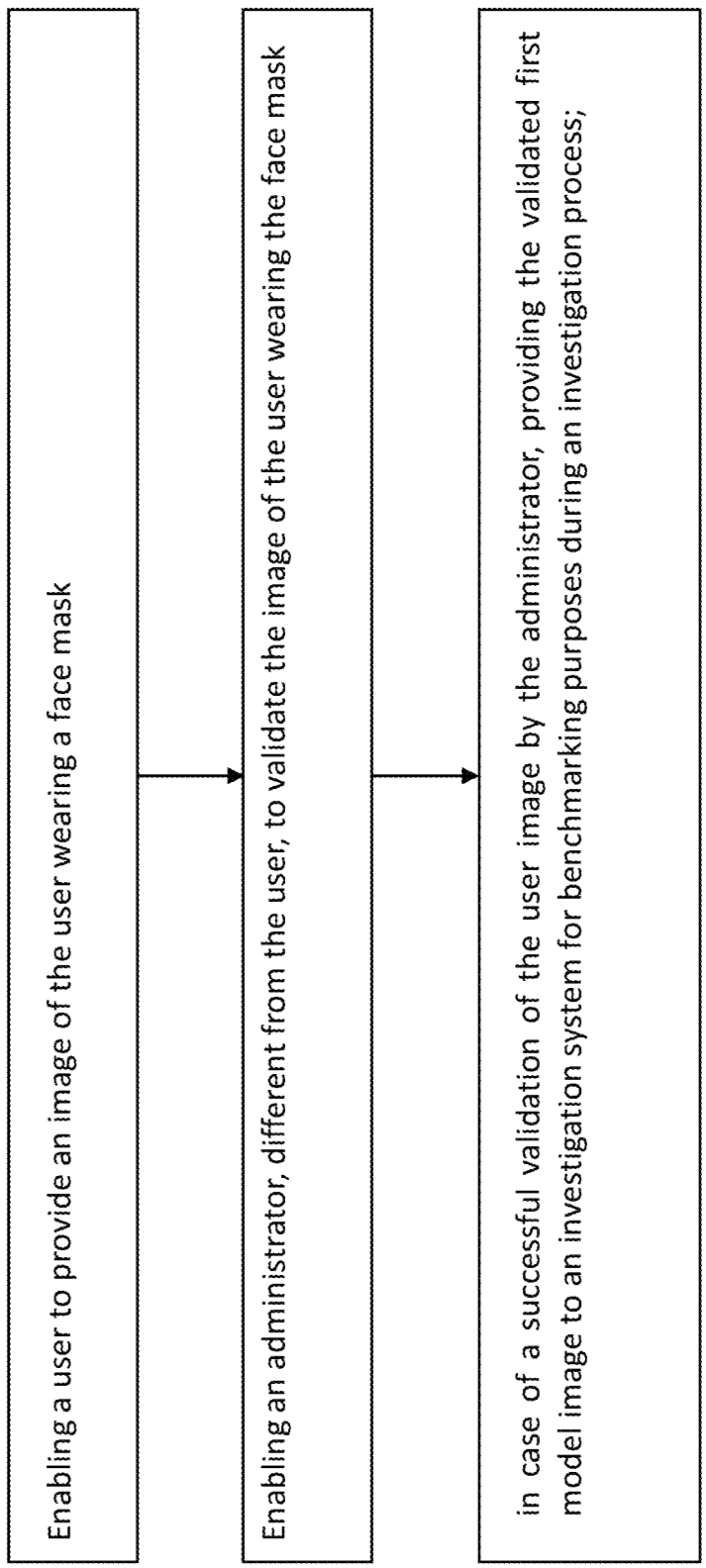
FIG. 7 illustrates a face mask authentication method in accordance with an embodiment of the present invention.
Figure 8:
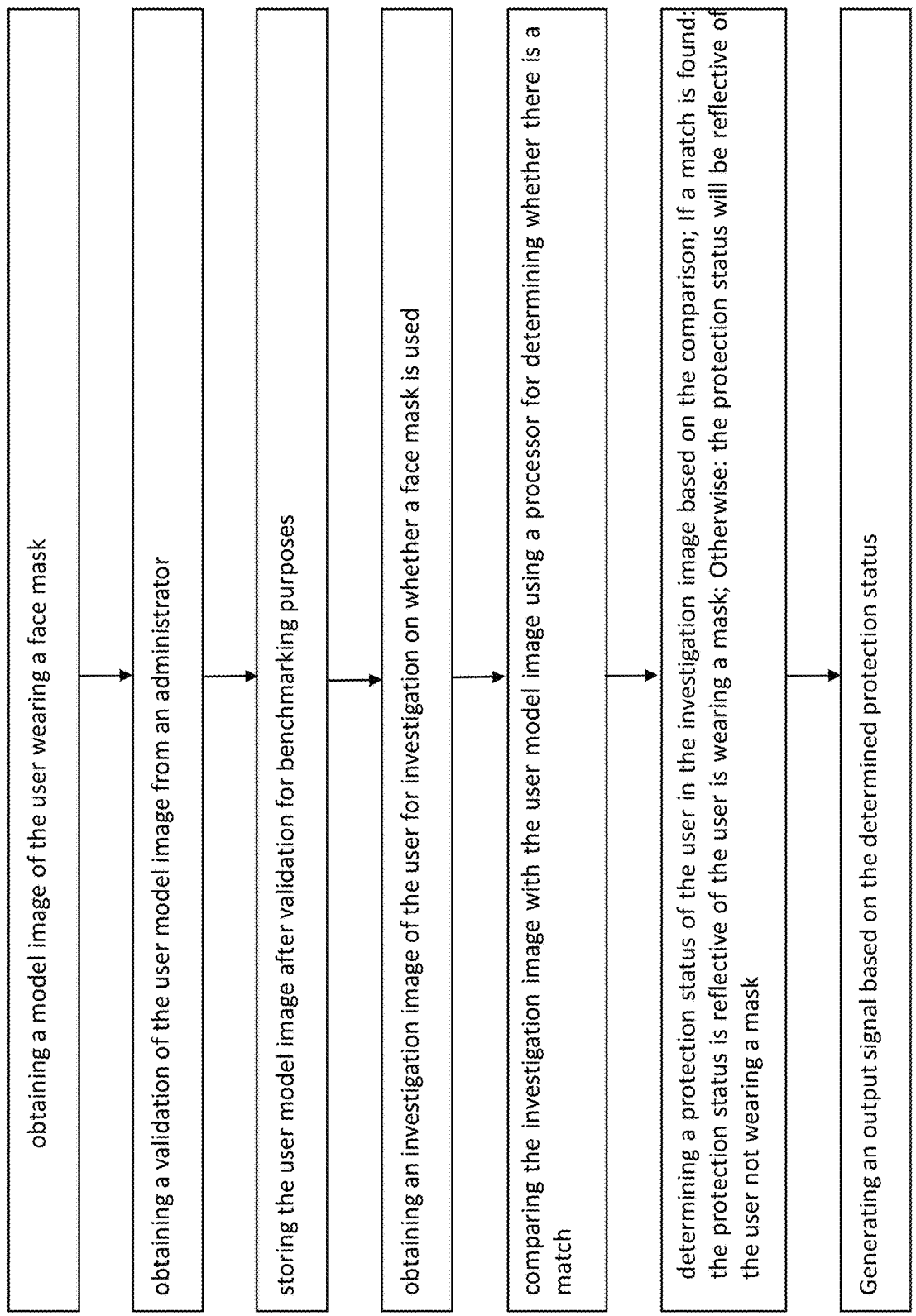
FIG. 8 illustrates a face mask detection method using a model image of the user wearing a mask in accordance with an embodiment of the present invention.
Figure 9:
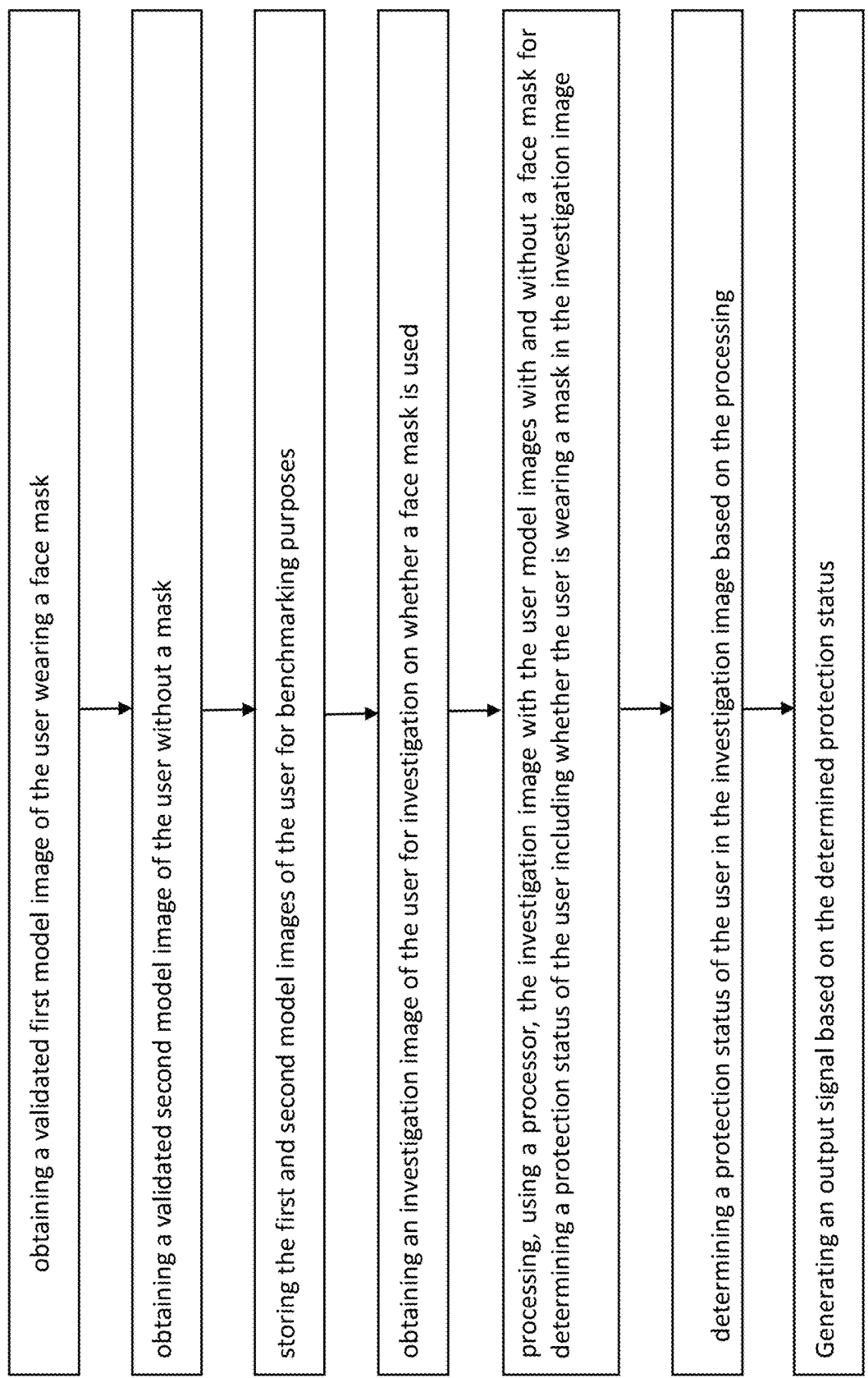
FIG. 9 illustrates a face mask detection method using a first model image of the user wearing a mask and a second model image of the user without a mask, in accordance with an embodiment of the present invention.
Figure 10:
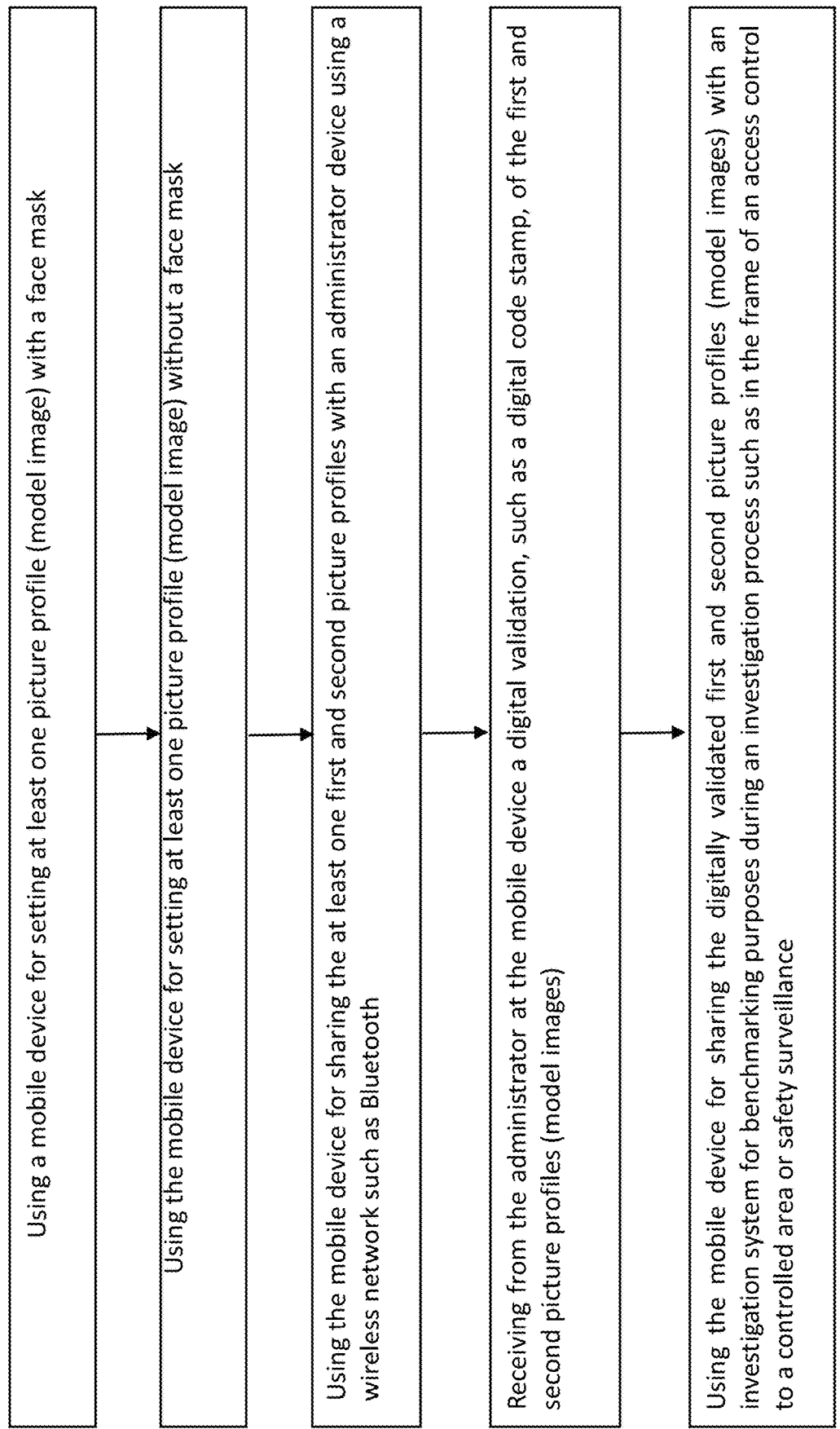
FIG. 10 illustrates a digital face mask authentication method using a mobile device 50, in accordance with an embodiment of the present invention.
Figure 11:
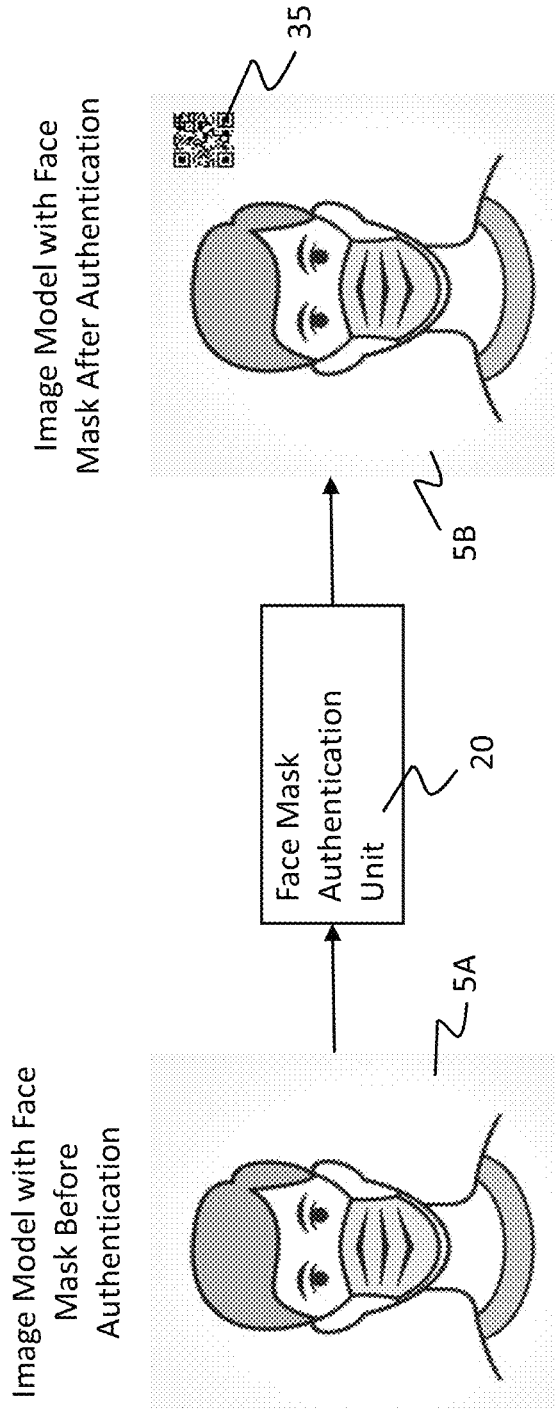
FIG. 11 illustrates a user model image before authentication 5A and the model image after authentication 35 by the face mask authentication unit 20 (with a digital authentication stamp or code applied to the model image).

The aspects of the invention will be described in conjunction with FIGS. 1-11. In the Detailed Description, reference is made to the accompanying figures, which form a part hereof, and in which is shown by way of illustration specific embodiments in which the invention may be practiced. It is to be understood that other embodiments may be utilized and logical changes may be made without departing from the scope of the present invention. The following detailed description, therefore, is not to be taken in a limiting sense, and the scope of the present invention is defined by the appended claims.

There is provided a face mask detection system 10 for detecting whether a user is wearing a face mask at any given time using image recognition. The face mask detection system 10 is configured to obtain an image of the user with the face mask, validate the image of the user wearing the face mask in order to confirm validity of the image, and as a subsequent step use the validated image of the user with the face mask as a model image for benchmarking purposes. The model image is preferably a head profile of the user wearing a face mask. A face mask investigation unit 60 compares the model image to an investigation image captured by an imaging system during an investigation process to determine whether the user in the investigation image is wearing the face mask. The face mask investigation unit 60 determines whether an exact match is found between both images (the model image and the investigation image). The face mask investigation unit 60 can be part of, or can be connected to, a safety surveillance system 200, an access control system 100 or any other system requiring face mask use detection. The face mask detection system 10 enables a user friendly, robust and expedite face mask recognition process since it is based on an exact matching analysis. The images according to the various embodiments of the invention are preferably digital images.

In an embodiment of the invention, a face mask is any type of object, device or garment, of any material, designed to be worn by a person to cover partially or totally the person's face, preferably for infection control protection purposes.

In an embodiment of the invention, the validation of the image is an authentication by a third party—preferably an administrator—that the provided proposed user image is a true and valid image of the user wearing the face mask.

In an embodiment of the invention, the validation/authentication action is conducted by a third party administrator, different from the user, who is authorized by an administration or management body to provide such a validation/authentication. The third party administrator can be a public or private person or entity, such as a public immigration official, a public notary, a security guard or any other person with administrative responsibilities in a private establishment such as a university, a shopping mall, a company, and the like. In an embodiment of the invention, the face mask detection system 10 comprises a Model image Selection Unit 20 and a Face Mask Investigation Unit 60 comprising at least one computer processor or controller configured to perform computer instructions stored a prior in a computer memory.

The Model image Selection unit 20 comprises an image capturing unit for obtaining at least one model image of the user for use as benchmarking purposes and a validation unit for validating, by an administrator different from the user, the at least one model image of the user as a condition precedent for the at least one model image to be used for benchmarking purposes by the Face Mask Investigation Unit 60.

In an embodiment of the invention, the at least one model image is a digital image.

In an embodiment of the invention, the at least one model image of the user comprises one or more images of the user wearing a face mask. In an embodiment of the invention, the at least one model image of the user also comprises one or more images of the user without a face mask.

In an embodiment of the invention, a plurality of images of the user wearing the face mask are obtained from various perspectives to enhance the accuracy level of the benchmarking and comparison process during the investigation analysis conducted by the face mask investigation unit 60. The plurality of images of the user wearing the face mask preferably comprise a front view, a first side view, a second side view, a top perspective view and a bottom perspective view.

In an embodiment of the invention, the digital image captured is a three dimensional image and the investigation analysis (also called image processing analysis) conducted by the face mask investigation unit 60 uses a 3D face recognition technique.

In an embodiment of the invention, the at least one model image of the user without the face mask preferably comprises a plurality of images of the user without the face mask obtained from various perspectives to enhance the accuracy level of the benchmarking and comparison process down the road. The plurality of images of the user without the face mask preferably comprise a front view, a first side view, a second side view, a top perspective view and a bottom perspective view.

In an embodiment of the invention, the at least one model image of the user with the face mask comprises a plurality of images of the user with various types of face masks. This is in case the user uses various types of face masks at various occasions and wishes to be recognized using any one of these face masks during an investigation process. The system in this case can validate the various user images with the various types of masks such that, during an investigation process by the face mask investigation unit 60, the face mask investigation unit 60 can recognize the user wearing any one of these pre-validated face masks.

In an embodiment of the invention, the Model Image Selection Unit 20 comprises a first User Interface (also called user interface 1) for obtaining the at least one model image of the user in one of the available modes including without limitation, capturing a picture of the user in real time, uploading a pre-stored picture of the user from a computer storage medium, receiving from an external device a picture of the user in real time through a wired or wireless network 45. The first user interface is configured to enable taking, uploading, receiving or otherwise capturing model images of the user with and without a face mask. The first user interface can be used by a user or a third party (such as an administrator) for obtaining the user's images.

In an embodiment of the invention, the first user interface comprises (or is connected to) a camera for capturing an image of the user in real time. The image capturing (such as taking a picture of the user) can be triggered by the user himself, or by an administrator different from the user who will be required to validate the picture during the validation process, or by a third party different from the user and the administrator (depending on the application).

In an embodiment of the invention, the first user interface is configured to enable the user to take pictures of himself to constitute the at least one model image. The pictures are preferably head profile pictures of the user in order to provide a better clarity and accuracy of the face features of the user and the face mask features used thereby. In another embodiment of the invention, the first user interface is configured to enable another party (such as the administrator) to take the pictures of the user to constitute the at least one model image. This depends on the configuration and the design of the face mask detection system 10 depending on the application. This is a preferred embodiment in the scenario where the same administrator is at the same time taking the user's model images and validating these.

In an embodiment of the invention, the Model Image Selection Unit 20 is part of a Face Mask Detection System 10 used by an administrative body (of a certain public or private entity or organization). In this case, the first user interface can comprise a press or touch button connected to a camera (external or internal to the system) configured to activate the camera for capturing an image of the user while the user is located in front of the camera sensor. The image of the user is obtained by the Image Capturing Unit.

In an embodiment of the invention, the Model Image Selection Unit 20 is part of a user device (such as a mobile application running on a user mobile device 50). In this case, the first user interface can be configured on said mobile application for enabling the user to take a self-image (picture) to constitute the at least one model image (which is required to be subsequently validated by an administrator). The first user interface in this case comprises a mechanism for enabling the user to activate the camera such as a touch or press button. The first user interface is connected to the mobile device 50 camera in this case for activating the camera, and the camera is connected to the image capturing unit for obtaining the image captured by the camera. The at least one model image can also be stored in the mobile storage medium and uploaded by the user using another touch or press button of the first user interface. Also, the first user interface can have a further touch or press button to enable the user to upload a pre-stored image from the cloud or another local or remote computer storage device or medium.

In an embodiment of the invention, the validation unit is connected to the image capturing unit for receiving and obtaining a validation of the at least one model image from an administrator different from the user. The administrator is a trusted person or entity being recognized as having authority to validate the at least one model image such as administration or management in a private or public entity or a person appointed thereby, or an administrator or officer in a private or public entity. A validation of the at least one model image preferably comprises an authentication of the at least one model image as a true and authentic image of the user.

If the model image is an image of the user wearing a face mask, the validation of the image is an authentication that the image is a true representation of the user wearing a face mask.

In an embodiment of the invention, the Model Image Selection Unit 20 comprises a second user interface (user interface 2) for enabling an administrator to validate the at least one model image of the user using the second user interface. In an embodiment of the invention, the first and second user interfaces are distinct user interfaces, particularly when the image capturing and the image validation are conducted separately and remotely one from the other.

In another embodiment, the first and second user interfaces are integrated within the same interface, particularly when the Model Image Selection Unit 20 is designed such that the image capturing process and the validation process are both conducted by the administrator himself or when these processes are conducted by various parties but at a same time and in physical presence of each other such that a same user interface can be used. For example, the Model Image Selection Unit 20 can be part of a mobile device 50 running a suitable mobile application, and the user can use the user interface of his mobile device 50 as the first user interface to capture his image and then hand his mobile device 50 to the administrator to use the user interface of the mobile device 50 as the second user interface to enter the validation code for the validation of the image captured by the user. The validation unit can communicate wirelessly with a remote code validation database (such as via Bluetooth) to confirm the validity of the validation code as being originated by an approved administrator.

In an embodiment of the invention, the at least one model image comprises one or more first model images with the user wearing a face mask and one or more second model images of the user not wearing a face mask. The first and second model images are classified as such and stored in their respective databases. The first model images are stored in a first database comprising the first model images of the user wearing a face mask, and the second model images are stored in a second database comprising the second model images of the user not wearing a face mask. Both the first and second databases are part of the validated user images database. Each digital image stored is therefore preferably classified as a first model image (with a face mask) or a second model image (without a face mask). This classification is important for the simplification of the image analysis process during the investigation process.

In an embodiment of the invention, the validation of the at least one model image comprises obtaining a validation code (or authentication code) in connection with the validated/authenticated at least one model image. The validation code is associated and stored in connection with the at least one validated model image. The validation code can be a QR code for example, or any other suitable digital stamp. The validation code can also be printed out on the face mask itself for user/image identification purposes during an investigation process by the face mask investigation unit 60 during the investigation process.

In an embodiment of the invention, the validation code comprises a digital stamp having an expiry date/time such that the validation code is only available for a specific period of time. The expiry date/time can be set a priori at the time of the initial validation of the model image, or alternatively defined a posteriori after the initial validation which can be based for example on the occurrence of an incident or event such as a safety breach by the user. Preferably, the digital stamp comprises an indication of the expiry date/time which can be extracted while scanning the image during the investigation process.

In an embodiment of the invention, the validation code is digitally applied on the validated image itself. The validation code can be associated to a unique identifier enabling to uniquely identify the validated image and/or the associated user. During the investigation process, in case a match is found between the investigation image and the model image, the validation code can be captured and mapped to the associated user such that the identity of the user is automatically identified. The validation code also enables to prove evidence that the model image has already been authenticated. In an embodiment of the invention, the authentication codes are stored in a database accessible for cross-checking as a proof of evidence of the authenticity of the validation code itself.

In an embodiment of the invention, the face mask validation unit stores the successfully validated model images in a database storing the validated user model images (also called the user validated images database).

In an embodiment of the invention, the Model Image Selection Unit 20 further comprises a second User Interface (also called user interface 2) connected to the validation unit for enabling an administrator, different from the user, to validate the at least one model image.

In an embodiment of the invention, the user interface is configured to request the administrator to approve or reject a model image as part of the image validation process.

In an embodiment of the invention, the second user interface is provided at an administrator portal and the second user interface comprises a touch or press button for approving or rejecting the model image.

In an embodiment of the invention, the first and second user interfaces are a single interface enabling the administrator to capture an image of the user in real time and simultaneously (or within a very short time period, preferably less than 2 minutes) validating the image for storage inside the validated user images database. According to this embodiment, the Model image Selection Unit 20 is preferably provided in an Administrator Device under the full control and authority of the administrator.

In an embodiment of the invention, the Model Image Selection Unit 20 is an independent device used by administration of an access-controlled area (such as a building, a shopping mall, airport, or any other facility) or part of their access-controlled system for granting access only to users wearing face masks and for monitoring the use of these face masks within the controlled area.

According to this example, users must present at a validation desk at the access-controlled entry and have their pictures wearing the face masks validated by the facility administration. This comprises selecting the at least one model image comprising a first model image with the user wearing the face mask and having this at least one model image validated/authenticated by the administrator. The validated at least one model image is then stored inside the validated user images database which is accessible to the face mask investigation unit 60. An image of the user accessing the access-controlled area (the investigation image) will be captured by an imaging system, and sent to the face mask investigation unit 60 for determining whether the user is wearing a face mask. The imaging system can for example comprise a camera at the access-controlled entry connected to the face mask investigation unit 60.

In an embodiment of the invention, the face mask investigation unit 60 comprises an image processing unit and an investigation user images database. The investigation user images database is connected to an imaging system for receiving the investigation images which needs to be investigated. The image processing unit, comprising a computer processing unit, is connected to the validated user model images database and to the investigation user images database for obtaining the validated model images and investigation images of the user, respectively from the validated user model images database and the investigation images database. The image processing unit conducts an imaging analysis using a computer algorithm for comparing both images (the model image and the investigation image) for determining if there is a match between both and for determining a protection status of the user (whether or not he is wearing a face mask) based the imaging analysis.

In an exemplary embodiment of the invention with an application to an access-control system, the imaging processing unit compares the investigation image to the validated at least one model image of the user stored a priori inside the validated user model images database, and if a match is found with the first model image (user wearing a face mask) it sends a signal to the access control system 100 with an indication of a successful match and confirmation that the user is wearing the face mask. The control access system provides access to the user on this basis. If no match is found between both images by the imaging processing unit, the face mask investigation unit 60 concludes that the user is not wearing a face mask and access is denied to the user.

In an embodiment of the invention, the user can register and get his at least one model image validated once, and then use the access control system 100 as long as the validated at least one model image is still applicable (same face mask is being used for example).

In an embodiment of the invention, the user can also register and validate multiple first model images with various face masks respectively and have all of these first model images validated and stored inside the validated user images database for use during the investigation process. In this case, the user will be determined by the face mask investigation unit 60 as wearing a face mask if at least one of these model images is a match with the picture captured in the investigation image at the time of access control. The user can also provide a second model image with without a face mask. In this case, this second model image is also validated and mapped in the system as being associated to the user face profile without a face mask and used during the investigation process. In this case, if there is a match between this second model image and the image of the user as captured in the investigation image at the time of access control, the face mask investigation unit 60 concludes that the user is not wearing a face mask and sends a signal in that effect to the access control system 100 to deny access to the user inside the controlled area.

In an embodiment of the invention, the imaging processing unit can also apply an algorithm using both the first model image (the user with a mask) and the second model image (the user without a face mask) during the investigation process where both first and second model images are used to provide a higher accuracy rate of the determination made by the imaging processing unit. The comparison process by the imaging processing unit of the investigation unit is conducted in a simple and quick manner as this requires an exact match comparison and not a complex face recognition analysis and approximations since the investigation unit is looking for an identical or quasi identical match between the investigation image and the model images.

The access-control system 100 can be part of a wide range of systems such as immigration control or custom systems, elevator access control system, building access control systems, shopping malls access control systems, premises access control systems (for external or internal doors) and so on. In an embodiment of the invention, the access control system 100 is associated to an elevator where users are controlled access using the face mask detection system 10 based on whether they are wearing or not wearing a face mask. In an embodiment of the invention, the Model image Selection Unit 20 is an independent device, or part of another device, used by or related to an administrative authority such as an immigration control or customs authority.

In an embodiment of the invention, users (example travelers in the case of an airport application) get their model images captured by the Model Image Selection Unit 20 when they present for administrative control at the access-controlled gate (for example, the immigration control at the access-controlled entry point). These model images, comprising the model images of the users wearing the face masks, are stored inside the validated user model images database which is accessible to the face mask investigation unit 60 during a subsequent investigation process by the face mask investigation unit 60. The surveillance imaging system inside the controlled zone (for example, the airport) allows the administrative authority (for example, the airport authority) to monitor the use of face masks by users (example, travelers) by capturing the users' images while they are inside the controlled zone (example the travelers' images in the case of the airport application while they are inside the airport) and sending these to the Face Mask Investigation Unit 60 for processing these captured images (called investigation images) based on the pre-stored model images of the users (example travelers in the example of an airport application). For any particular user (for example, a specific traveler), the Face Mask Investigation Unit 60 would search for a match between an investigation image captured by the controlled area surveillance imaging system 200 and the pre-stored user model image wearing the face mask. If no match is found, a traveler is found to be in breach of the safety measures by not wearing the face mask. If a match is found, then the user is determined to be in compliance with the safety measures by wearing the face mask.

In an embodiment of the invention, the user is first being identified by the face mask investigation unit 60 using a user identifier before an investigation is conducted by the investigation unit. In this case, the investigation conducted by the investigation unit is targeted to user model images stored in related to that specific user only (eliminating the need to run a search based on all the stored model images in the scenario where the user is not identified a prior before the investigation process is initiated).

In an embodiment of the invention, the user is identified first through a user identification system connected to the face mask detection system 10 (and particularly to the face mask investigation unit 60). The user identification system identifies the user and sends the user identifier to the face mask investigation unit 60. The face mask investigation unit 60 than extracts the model images associated to that specific identified user from the validated model images database and runs the imaging analysis with the comparison between the images to determine whether the user is wearing the face mask.

In an embodiment of the invention, the user identification system is part of the face mask investigation unit 60. The user can be triggered to provide his user identifier first, for identifying the user and tailoring the search. The identity of the user can also be obtained using any other suitable means.

In an embodiment of the invention, at the time of validation of the user model images by the validation unit, a validation code is stored in connection with the at least one validated model image and the associated identity of the user, and in this case the validation code is further communicated to the user for future user identification purposes. During the investigation process (which happens at a future time subsequent to the validation process), the validation code is obtained from the user in order to first identify the user and/or the associated validated model image, and as such further used for targeting the search and the comparison process. Depending on the application, the face mask investigation unit 60 can trigger the user to enter the user code through a user interface or alternatively the face mask investigation unit 60 can be configured to automatically obtain the user code from the user.

In an embodiment of the invention, the validation code is printed on the face mask used by the user for purposes of identification. The validation code can be a QR code for example uniquely identifying the user and/or the digital model image of the user. The investigation image would in that case comprise an image of the user wearing the face mask with the validation code appearing of the face mask. The validation code is interpreted by the face mask investigation unit 60 for identifying the user and/or the related model image of the user stored inside the validated user images database. A targeted search and matching comparison is then made on that basis.

It should be understood that the proposed face mask detection system 10 is a requirement for purposes of face mask use detection even if a validation code is applied. This is as a detection of a validation code alone (without image comparison analysis as proposed herein) is not sufficient to confirm or infirm face mask use by the user, as a breaching user would still be able to trick the system by having the system detect the validation code (positioned on the face mask) without however wearing the face mask on his face (as for example he can be holding the face mask in his hands).

As another aspect of the invention, there is provided face mask detection methods, preferably computer-implemented methods.

In an embodiment of the invention, there is provided a face mask detection method comprising: a) enabling a user to provide an image of the user wearing a face mask; b) enabling an administrator, different from the user, to validate the image of the user wearing the face mask; in case of a successful validation of the user image by the administrator, providing the validated first model image to an face mask investigation unit or device for benchmarking purposes during an investigation process. The method is preferably computer-implemented using a computer processor or controller part of a computer server.

In an embodiment of the invention, there is provided a face mask detection method comprising: a) obtaining a model image of the user wearing a face mask; b) obtaining a validation of the user model image from an administrator different from the user; c) storing the user model image in a computer storage medium after validation for benchmarking purposes; d) obtaining an investigation image of the user for investigation in order to determine whether a face mask is worn by the user; e) comparing the investigation image with the user model image using a computer processor for determining whether there is a match; f) determining a protection status of the user in the investigation image based on the comparison; If a match is found: the protection status is reflective of the user is wearing a mask; Otherwise: the protection status will be reflective of the user not wearing a mask; g) generating an output computer signal based on the determined protection status. The method is preferably computer-implemented, partially or totally, using one or more computer processors.

In an embodiment of the invention, there is provided a face mask detection method comprising: a) obtaining a validated first model image of the user wearing a face mask; b) obtaining a validated second model image of the user without a mask; c) storing the first and second model images of the user in a computer storage medium for benchmarking purposes; d) obtaining an investigation image of the user for investigation on whether a face mask is used; e) processing, using a computer processor, the investigation image with the user model images with and without a face mask for determining a protection status of the user including whether the user is wearing a mask in the investigation image; f) determining a protection status of the user in the investigation image based on the processing; g) Generating an output computer signal based on the determined protection status. The method is preferably computer-implemented, partially or totally, using one or more computer processors.

In an embodiment of the invention, there is provided a face mask detection method comprising: a) using a mobile device 50 for setting at least one picture profile (model image) with a face mask; b) preferably, using the mobile device 50 for setting at least one picture profile (model image) without a face mask; c) using the mobile device 50 for sharing the at least one first and second picture profiles with an administrator device using a wireless network such as Bluetooth; d) receiving from the administrator at the mobile device 50 a digital validation, such as a digital code stamp, of the first and second picture profiles (model images); e) using the mobile device 50 for sharing the digitally validated first and second picture profiles (model images) with a face mask investigation unit 60, device or system for benchmarking purposes during an investigation process such as in the frame of an access control to a controlled area or safety surveillance. The method is preferably computer-implemented, partially or totally, using one or more computer processors. The f 50 can be a smart device, such as an IPhone or IPad or any other type of smart devices.

The various components of the systems, devices and units can be running on a single computer, computing server or device or can be distributed over a plurality of computing servers or devices with local or remote connection there between when required. The various actions of the methods described under the various embodiments of the invention can also be running over various computer components distributed over a plurality of computer devices or servers connected locally or remotely through a wireless data network. The way of distributing the various components of the systems, devices and units according to the various embodiments of the present invention is a question of design, based on the specific application. The same thing apply for the described methods.

In an embodiment of the invention, there is provided an access-control system 100 comprising the face mask investigation system or the face mask investigation unit 60 in accordance with the various embodiments of the present invention.

In an embodiment of the invention, there is provided a safety surveillance system 200 comprising an imaging surveillance system and a face mask investigation system or a face mask investigation unit 60 in accordance with the various embodiments of the present invention.

Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims which follow.

The invention claimed is:

1. A computer-implemented face mask detection method comprising the steps of:
    obtaining at least one model image of a user comprising a first model image of the user wearing a face mask;
    storing the at least one model image in a computer storage medium for benchmarking purposes;
    obtaining an investigation image of the user at a given time during an investigation process;
    processing, using a processor, the investigation image as a function of the at least one model image of the user for determining a protection status of the user at said given time; and
    generating an output signal based on the determined protection status of the user at said given time,
    wherein at least one of the steps are conducted using a mobile device associated to the user, wherein the steps comprise using the mobile device for setting at least two user profiles: a first user profile with a face mask comprising the first model image; and a second user profile without a face mask comprising a second model image, and sharing the at least one first and second user profile or model image with an administrator device for validation.

2. The computer-implemented face mask detection method of claim 1, further comprising obtaining an authentication or validation of the at least one model image prior to and as a condition precedent to storing said at least one model image in the computer storage medium for benchmarking purposes.

3. The computer-implemented face mask detection method of claim 2, wherein obtaining an authentication or validation of the at least one model image comprises:
    enabling an administrator, different from the user, to authenticate or validate said at least one model image as an authentic image of the user, and
    enabling the administrator to authenticate said first model image as an authentic image of the user wearing the face mask.

4. The computer-implemented face mask detection method of claim 3, wherein:
    obtaining the at least one model image of the user comprises providing a user interface for taking, uploading or otherwise capturing at least one picture of the user comprising a first picture of the user wearing the face mask, wherein the at least one model image is selected from the at least one picture; and
    obtaining an authentication of the at least one model image comprises providing a second user interface for enabling the administrator to authenticate the at least one model image as being a true image of the user comprising enabling said administrator to authenticate the first model image as a true image of the user wearing the face mask.

5. The computer-implemented face mask detection method of claim 4, wherein processing the investigation image for determining the protection status of the user comprises comparing the investigation image to the first model image for determining if there is a match between the investigation image and the first model image, and wherein the protection status of the user is reflective of the user wearing the face mask in case a match is found between the first model image and the investigation image, otherwise in case of mismatch between both images, the protection status of the user is reflective of the user not wearing the face mask.

6. The computer-implemented face mask detection method of claim 5, wherein the obtaining the at least one model image of the user and the obtaining an authentication or validation of the at least one model image comprises enabling the administrator to use the first and second interfaces for both obtaining and authenticating or validating the at least one model image of the user.

7. The computer-implemented face mask detection method of claim 6, wherein obtaining and authenticating or validating the at least one model image are conducted during a same time period while the administrator is in physical presence of the user, as a requirement for the authentication.

8. The computer-implemented face mask detection method of claim 7, wherein processing the investigation image for determining the protection status of the user comprises comparing the investigation image to the second model image for determining if there is a match between the investigation image and the second model image, and wherein the protection status of the user is reflective of the user not wearing the face mask in case a match is found between the second model image and the investigation image.

9. The computer-implemented face mask detection method of claim 1, wherein the output face mask detection signal is an access control signal for controlling access of the user to an access-controlled area based on the determined protection status of the user, where the user is granted access to the access-controlled area in case the user is determined to be wearing the face mask and the user is denied access to the access-controlled area in case the user is determined not to be wearing the face mask as reflected by the protection status of the user.

10. A face mask detection system comprising:
    an image capturing unit for obtaining at least one model image of a user comprising a first model image of the user wearing a face mask;
    a computer storage medium connected for storing the at least one model image for benchmarking purposes;
    an image processing unit, comprising a processor, connected to the image capturing unit and to the computer storage medium for obtaining an investigation image of the user at a given time during an investigation process and for processing the investigation image as a function of the at least one model image of the user for determining a protection status of the user at said given time, and for generating an output signal based on the protection status of the user at said given time,
    wherein at least a part of the system components are part of a mobile device associated to the user for conducting at least one of the steps comprising setting at least two user profiles: a first user profile with a face mask comprising the first model image; and a second user profile without a face mask comprising a second model image, and sharing the at least one first and second user profile or model image with an administrator device for validation.

11. The face mask detection system of claim 10, further comprising an authentication or validation unit connected to the image capturing unit and to the computer storage medium for obtaining an authentication or validation of the at least one model image prior to and as a condition precedent to storing said at least one model image in the computer storage medium for benchmarking purposes.

12. The face mask detection system of claim 11, wherein obtaining an authentication or validation of the at least one model image comprises enabling an administrator, different from the user, to authenticate or validate said at least one model image as an authentic image of the user comprising enabling the administrator to authenticate said first model image as an authentic image of the user wearing the face mask.

13. The face mask detection system of claim 12, further comprising:
   a first user interface connected to the image capturing unit for enabling taking, uploading or otherwise capturing at least one picture of the user comprising a first picture of the user wearing the face mask, wherein the at least one model image is selected from the at least one picture; and
   a second user interface connected to the authentication or validation unit for enabling the administrator to authenticate or validate the at least one model image as being a true image of the user comprising enabling said administrator to authenticate or validate the first model image as a true image of the user wearing the face mask.

14. A computer-implemented face mask detection method comprising the steps of:
   enabling a user to provide a first model image of the user wearing a face mask;
   enabling an administrator, different from the user, to authenticate the first model image of the user comprising confirming that the first model image is a true image of the user wearing a face mask;
   in case of a successful authentication of the first model image by the administrator, providing the authenticated first model image to an investigation system for benchmarking purposes during an investigation process;
   obtaining an investigation image of the user by the investigation system and comparing the obtained investigation image with the authenticated first model image to determine if there is a match; and
   generating a signal with an indication of whether the user is wearing a face mask in the investigation image based on the comparison,
   wherein at least one of the steps are conducted using a mobile device associated to the user, wherein the steps comprise using the mobile device for setting at least two user profiles: a first user profile with a face mask comprising the first model image; and a second user profile without a face mask comprising a second model image, and sharing the at least one first and second user profile or model image with an administrator device for validation.

15. The computer-implemented facemask detection method of claim 14, wherein the investigation system determines that the user is wearing a face mask in the investigation image in case there is a high accuracy match between the investigation image and the first model image.

16. The computer-implemented face mask detection method of claim 15, wherein:
   enabling the user to provide a first model image comprises providing a first user interface configured to enable taking or uploading a picture of the user wearing the face mask; and
   enabling an administrator to authenticate the first model image comprises providing a second user interface configured to enable the administrator to approve or reject the first model image.

17. The computer-implemented face mask detection method in accordance with claim 14 comprising:
   using a first user interface for enabling the user to provide the first model image of the user wearing said face mask;
   using a second user interface for enabling the administrator, different from the user, to authenticate the first model image of the user comprising confirming that the first model image is a true image of the user wearing said face mask; and
   using a communication unit for providing the authenticated first model image to the investigation system for benchmarking purposes during said investigation process in case of a successful authentication of the first model image by the administrator.

18. The computer-implemented face mask detection method of claim 17, wherein:
   configuring the first user interface to enable taking or uploading a picture of the user wearing the face mask for the first model image; and
   configuring the second user interface to enable the administrator to approve or reject the first model image.

19. The computer-implemented face mask detection method of claim 18, wherein:
   conducting the authentication by the administrator remotely from the user; and
   enabling the administrator to authenticate the first model user image comprises providing an authenticated image of the user without the mask to the administrator to be used as a basis for the authentication of the first model image of the user wearing the mask.

* * * * *